US008095873B2

(12) United States Patent
Kipp et al.

(10) Patent No.: US 8,095,873 B2
(45) Date of Patent: Jan. 10, 2012

(54) PROMOTING CONTENT FROM ONE CONTENT MANAGEMENT SYSTEM TO ANOTHER CONTENT MANAGEMENT SYSTEM

(75) Inventors: Sandra Darcy Kipp, Raleigh, NC (US); Mark E. Molander, Cary, NC (US); Kerry A. Ortega, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 707 days.

(21) Appl. No.: 11/695,549

(22) Filed: Apr. 2, 2007

(65) Prior Publication Data

US 2008/0243877 A1  Oct. 2, 2008

(51) Int. Cl.
*G06F 17/21* (2006.01)
(52) U.S. Cl. ..................................................... 715/255
(58) Field of Classification Search .................. 715/277, 715/255
See application file for complete search history.

(56) References Cited

U.S. PATENT DOCUMENTS

| | | | |
|---|---|---|---|
| 5,724,567 A * | 3/1998 | Rose et al. ............................ 1/1 |
| 5,781,732 A * | 7/1998 | Adams ........................... 709/205 |
| 5,867,799 A | 2/1999 | Lang et al. |
| 6,493,703 B1 * | 12/2002 | Knight et al. ...................... 707/3 |
| 6,571,234 B1 * | 5/2003 | Knight et al. ...................... 707/3 |
| 6,582,472 B2 * | 6/2003 | Hart ............................. 623/23.7 |
| 6,584,471 B1 * | 6/2003 | Maclin et al. ......................... 1/1 |
| 6,807,566 B1 * | 10/2004 | Bates et al. .................... 709/206 |
| 6,826,596 B1 * | 11/2004 | Suzuki ........................... 709/206 |
| 6,851,087 B1 * | 2/2005 | Sibert ........................... 715/236 |
| 6,865,572 B2 * | 3/2005 | Boguraev et al. .................. 707/5 |
| 6,938,203 B1 * | 8/2005 | Dimarco et al. .............. 715/209 |
| 7,031,952 B1 * | 4/2006 | Heumann et al. ................. 707/1 |
| 7,043,492 B1 * | 5/2006 | Neal et al. ...................... 707/101 |
| 7,185,065 B1 * | 2/2007 | Holtzman et al. ............. 709/217 |
| 7,197,470 B1 * | 3/2007 | Arnett et al. .................... 705/10 |
| 7,200,606 B2 * | 4/2007 | Elkan ........................... 707/102 |
| 7,203,704 B1 * | 4/2007 | Stern et al. ................. 707/104.1 |
| 7,418,437 B1 * | 8/2008 | Marks ................................... 1/1 |
| 7,596,578 B1 * | 9/2009 | Marks ........................ 707/104.1 |

(Continued)

FOREIGN PATENT DOCUMENTS

EP  WO2007/135436  11/2007

OTHER PUBLICATIONS

Resnick et al., Grouplens: An Open Architecture for Collaborative Filtering of Netnews, 1994, ACM CSCW '94, pp. 175-186.*

(Continued)

*Primary Examiner* — Laurie Ries
*Assistant Examiner* — Frank D Mills
(74) *Attorney, Agent, or Firm* — David W. Victor; Konrad Raynes and Victor LLP (57) ABSTRACT

Provided are a method, system, and program for promoting content from one content management system to another content management system. Content from a first content management system satisfying a content criteria is determined. The first content management system includes content objects added by users in a collaborative environment. A second content management system providing content objects associated with content categories is processed to determine one of the content categories relevant to the determined content from the first content management system. The determined content is added to the second content management system and the content added to the second content management system is associated with the determined content category.

21 Claims, 6 Drawing Sheets

U.S. PATENT DOCUMENTS

| | | | |
|---|---|---|---|
| 2001/0018698 A1* | 8/2001 | Uchino et al. | 707/533 |
| 2001/0056371 A1* | 12/2001 | Shuster | 705/14 |
| 2002/0062368 A1* | 5/2002 | Holtzman et al. | 709/224 |
| 2002/0099731 A1* | 7/2002 | Abajian | 707/500 |
| 2003/0004909 A1* | 1/2003 | Chauhan et al. | 706/45 |
| 2003/0014311 A1* | 1/2003 | Chua | 705/14 |
| 2003/0018658 A1* | 1/2003 | Suermondt et al. | 707/204 |
| 2003/0093478 A1 | 5/2003 | Hughes | |
| 2003/0164849 A1* | 9/2003 | Barrie et al. | 345/733 |
| 2003/0208535 A1 | 11/2003 | Appleman et al. | |
| 2004/0128673 A1* | 7/2004 | Fuchs et al. | 719/310 |
| 2005/0050444 A1* | 3/2005 | Vasey | 715/500 |
| 2005/0248790 A1* | 11/2005 | Ornstein et al. | 358/1.12 |
| 2006/0004601 A1* | 1/2006 | Marks | 705/1 |
| 2006/0074846 A1 | 4/2006 | Feinberg et al. | |
| 2006/0095830 A1* | 5/2006 | Krishna et al. | 715/500 |
| 2006/0155809 A1* | 7/2006 | Arav | 709/204 |
| 2006/0167737 A1* | 7/2006 | Muller et al. | 705/9 |
| 2006/0173985 A1* | 8/2006 | Moore | 709/223 |
| 2006/0242554 A1* | 10/2006 | Gerace et al. | 715/501.1 |
| 2007/0078675 A1* | 4/2007 | Kaplan | 705/1 |
| 2007/0124432 A1* | 5/2007 | Holtzman et al. | 709/219 |
| 2007/0208614 A1* | 9/2007 | Arnett et al. | 705/10 |
| 2007/0214097 A1* | 9/2007 | Parsons et al. | 706/12 |
| 2008/0071929 A1* | 3/2008 | Motte et al. | 709/246 |
| 2008/0077574 A1* | 3/2008 | Gross | 707/5 |
| 2008/0168045 A1* | 7/2008 | Suponau et al. | 707/5 |
| 2008/0244438 A1* | 10/2008 | Peters et al. | 715/772 |
| 2008/0320090 A1* | 12/2008 | Bryan | 709/206 |

OTHER PUBLICATIONS

Lerman, Social Networks and Social Information Filtering on Digg, Dec. 7, 2006, Cornell University Library, pp. 1-8. Retrieved from http://arxiv.org/abs/cs/0612046v1.*

Breslin et al., Towards Semantically-Interlinked Online Communities, 2005, Springer-Verlag, Lecture Notes in Computer Science vol. 3532, pp. 500-514.*

International Search Report and Written Opinion dated Jul. 14, 2008, for Application No. PCT/EP2008/052601 filed Mar. 4, 2008.

M. Balabanovic, et al., "FAB: Content-Based, Collaborative Recommendation", ACM, vol. 40, No. 3, Mar. 1997, Document XP 000689872, pp. 66-70.

J. Delgado, et al., "Content-Based Collaborative Information Filtering: Actively Learning to Classify and Recommend Documents", Cooperative Information Agents, Jul. 1998, Document XP 002923272, pp. 206-208.

A. Nenkova, et al., "Email Classification for Contact Centers", Proceedings of the ACM Symposium on Applied Computing, Mar. 2003, Document XP 002432982, pp. 789-790.

A. Salminen, et al., "From Text to Hypertext by Indexing", ACM Transactions on Information Systems, vol. 13, No. 1, Jan. 1995, pp. 69-99.

M. Raitner, "Open Problems Wiki", Institution of Electrical Engineers, 2006 pp. 508-509.

G. Zhang, et al., "Scalable Information Sharing Utilizing Decentralized P2P Networking Integrated with Centralized Personal and Group Media Tools", Institution of Electrical Engineering, 2006, pp. 1-5.

"Wiki", Wikipedia, [online][retrieved Mar. 2, 2007], http://en.wikipedia.org/w/index.php?title=Wiki&printable=yes, pp. 1-7.

"Internet Forum", Wikipedia, [online][retrieved Mar. 2, 2007], http://en.wikipedia.org/w/index.php?title=Internet_forum&printable=yes, pp. 1-4.

* cited by examiner

FIG. 1

Message Thread Information

FIG. 2

Category Information

PROMOTING CONTENT FROM ONE CONTENT MANAGEMENT SYSTEM TO ANOTHER CONTENT MANAGEMENT SYSTEM

BACKGROUND OF THE INVENTION

1. Field of the Invention

The present invention relates to a method, system, and article of manufacture for promoting content from one content management system to another content management system.

2. Description of the Related Art

A computer user community comprises a network computing environment where users collaborate to add and edit content. For instance, in message forums, one user may pose a technical or other type of question, and other users respond. The content of such message forums can contain fragments of information that may be useful to users of other content management systems. Often users of different content management systems, such as message forums, Wikis, Blogs, and other collaborative systems, etc., may have to separately visit different content management systems to obtain the information they need.

There is a need in the art for improved techniques for managing content from different content management systems.

SUMMARY

Provided are a method, system, and program for promoting content from one content management system to another content management system. Content from a first content management system satisfying a content criteria is determined. The first content management system includes content objects added by users in a collaborative environment. A second content management system providing content objects associated with content categories is processed to determine one of the content categories relevant to the determined content from the first content management system. The determined content is added to the second content management system and the content added to the second content management system is associated with the determined content category.

DETAILED DESCRIPTION

Figure 1:
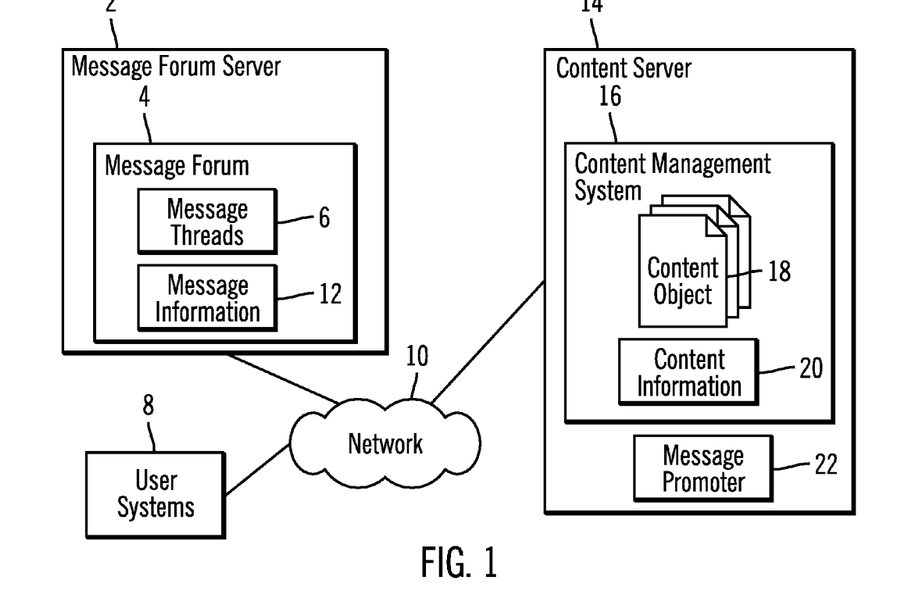
FIG. 1 illustrates an embodiment of a network computing environment.

FIG. 1 illustrates an embodiment of a computing environment including a message forum server 2 running a message forum 4 including a plurality of message threads 6. Users at user systems 8 may access the message forum 4 over a network 10 (e.g., the Internet, a Local Area Network (LAN), Intranet, etc.) to post messages and replies to the messages. A message thread 6 may comprise an initial message posing a query on a topic and may also include one or more reply messages providing an answer or information related to the query. The message forum 4 program further comprises message information 12 on the messages and threads 6, such as a message database.

A content server 14 runs a content management system 16 managing content objects 18 having information on various topics or categories of information. A content object 18 may comprise a document (e.g., a word processing document, Hypertext Markup Language (HTML) page, Extended Markup Language (XML) page, etc.), multimedia file (still images, motion picture), database table or data, spreadsheet, etc. The content objects 18 may be organized according to categories of information created in the content management system 4. The content objects 18 may be created and edited by users at user systems 8 in a collaborative environment, such as a Wiki, Blog, or other content management systems 2. The content management system 16 may further include content information 20 providing information on the content objects. A message promoter 22 comprises a program that selects content, e.g., messages, from the message forum 4 to promote to content objects 18 in the content management system 16. For instance, the content of a message thread 6 may be inserted into a content object 18, such as a content page.

In the embodiment of FIG. 1, the message forum 4 and content management system 16 run on separate servers 2 and 14, respectively. In an alternative embodiment, the message forum 4 and content management system 16 may run on a same server, and/or the message promoter 22 may run on a separate server. In one embodiment, the message server 2 and/or content server 14 may be used within an enterprise, where access is restricted to authorized enterprise users 8. Alternatively, the message server 4 and/or content server 14 may be accessible to users over a publicly accessible network, such as the Internet. The users 8 may collaborate to add and edit content to the message forum 4 and content management system 16, where registration and/or authentication may or may not be required for access to the message forum 4 and content management system 16.

The message promoter 22 program may process one or more message forums 4 over the network 10, such as the Internet, to locate message threads 6 to promote to the content management system 16. The message promoter 22 may be provided a list of web sites or network addresses of message forums 4 to access or may crawl the network 10 (e.g., the Internet) for message forums 4 having message threads 6 on topics relevant to content in the content management system 16 to determine whether to promote the message threads to the content management system 16.

Figure 2:
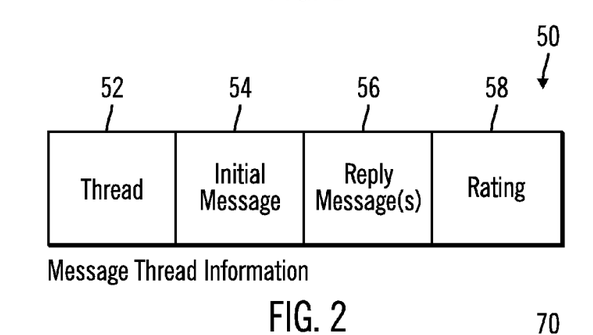
FIG. 2 illustrates an embodiment of message thread information.

FIG. 2 illustrates an embodiment of message thread information 50 providing information for one message thread 6 in the message information 8. The message information 8 may comprise a database or other data structure that provides information on message threads 6 available in the message forum 4. The message thread information 50 includes an identifier of the thread 52; an initial message 54 including a query or question on a topic which initiated the thread; one or more reply messages 56 providing a response to the initial message 54, where the reply may provide a descriptive answer to the question, links or attachments to web pages or other documents providing an answer to the question or comments on the question; and a rating 58 indicating a user provided rating of the thread 52. Users may select a value in a range of possible values to indicate the relative value of the thread. The rating 58 for the thread 52 may comprise an average or other derivative value from the sum of user ratings. For instance, ratings from users who themselves have higher ratings may be afforded greater weight in determining an overall rating for the thread 52. A rating may apply to the thread 52 as a whole or, alternatively, there may be a separate rating for the initial message 54 having the question and for each reply message 56. The message 54 and 56 information may comprise the complete content of the message or a pointer to the message in a storage location.

Figure 3:
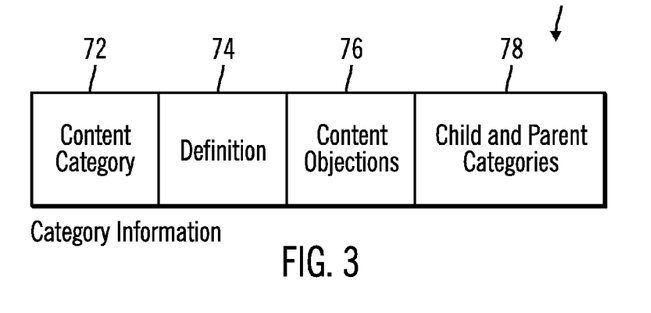
FIG. 3 illustrates an embodiment of category information for categories in a content management system.

FIG. 3 illustrates an embodiment of an instance of category information 70 for a category of content objects 18 maintained in the content information 20, which may include a content category 72, such as a topical category, class of information, etc.; a category definition 74 comprising a textual description of the category, such as keywords, etc.; content objects 76 associated with the content category 72 and child and parent content categories 78. A category 72 may define a specific topic, class of information, subject, etc., such that content objects 18 are associated with one or more categories. The content object 76 field in the information 70 for a category may comprise a location or identifier of the associated content objects or the content objects themselves. In one embodiment, the content information 70 may be expressly defined in a database or data structure. For instance, the category information 70 instances may comprise rows in a database table or database objects. In an alternative embodiment, the category information 70 may be coded in the content objects 18 themselves with or without the use of a database of content information. For instance, the category of a content object may be coded in metadata information, tags, headers, or the content of the content object and the child and parent categories may be determined from links or other references in the content object to other content objects 18 associated with other categories.

Figure 4:
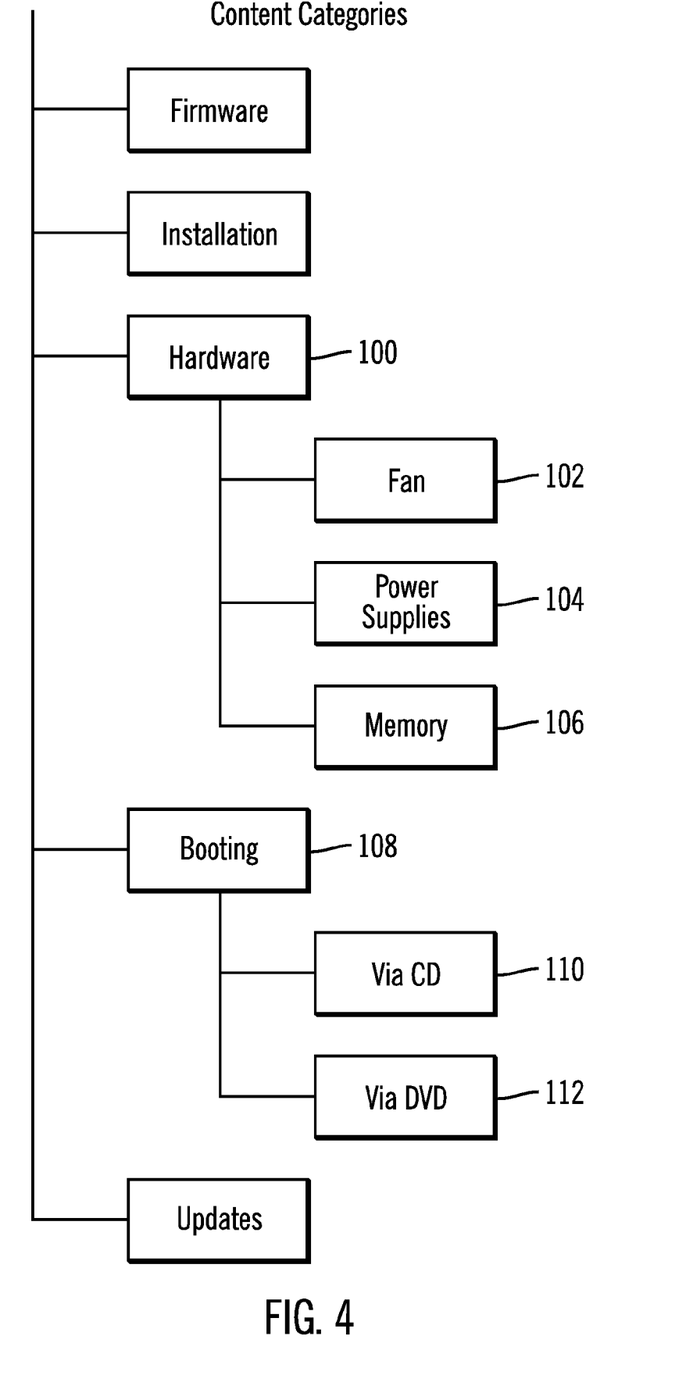
FIG. 4 illustrates an embodiment of a hierarchical arrangement of categories in a content management system.

FIG. 4 illustrates an embodiment of a hierarchical arrangement of categories of information in a content management system 16, such as categories for a computer server. The hardware category 100 includes child categories of fan 102, power supplies 104, and memory 106 and the booting category 108 includes child categories of booting via CD 110 and booting via DVD 112. As discussed, information on the hierarchical relationship of categories may be indicated in content information 20 or may be indicated in the content objects 18 themselves. Further, in an alternative embodiment, some or all of the categories of content objects 18 may be in a non-linear or non-hierarchical relationship.

Figure 5:
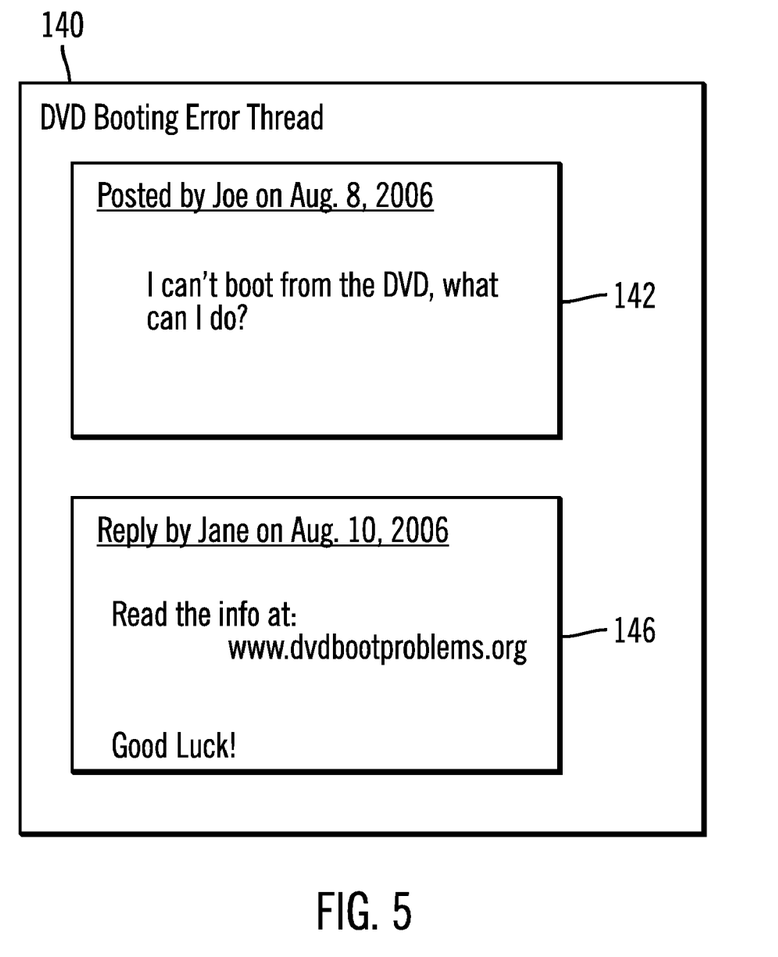
FIG. 5 illustrates an embodiment of a message thread.

FIG. 5 illustrates an example of a message thread 140 on the topic of a DVD booting error. The thread includes an initial message 142 posing a question or inquiry on a topic and a reply message 146 providing a response to the question.

Figure 6:
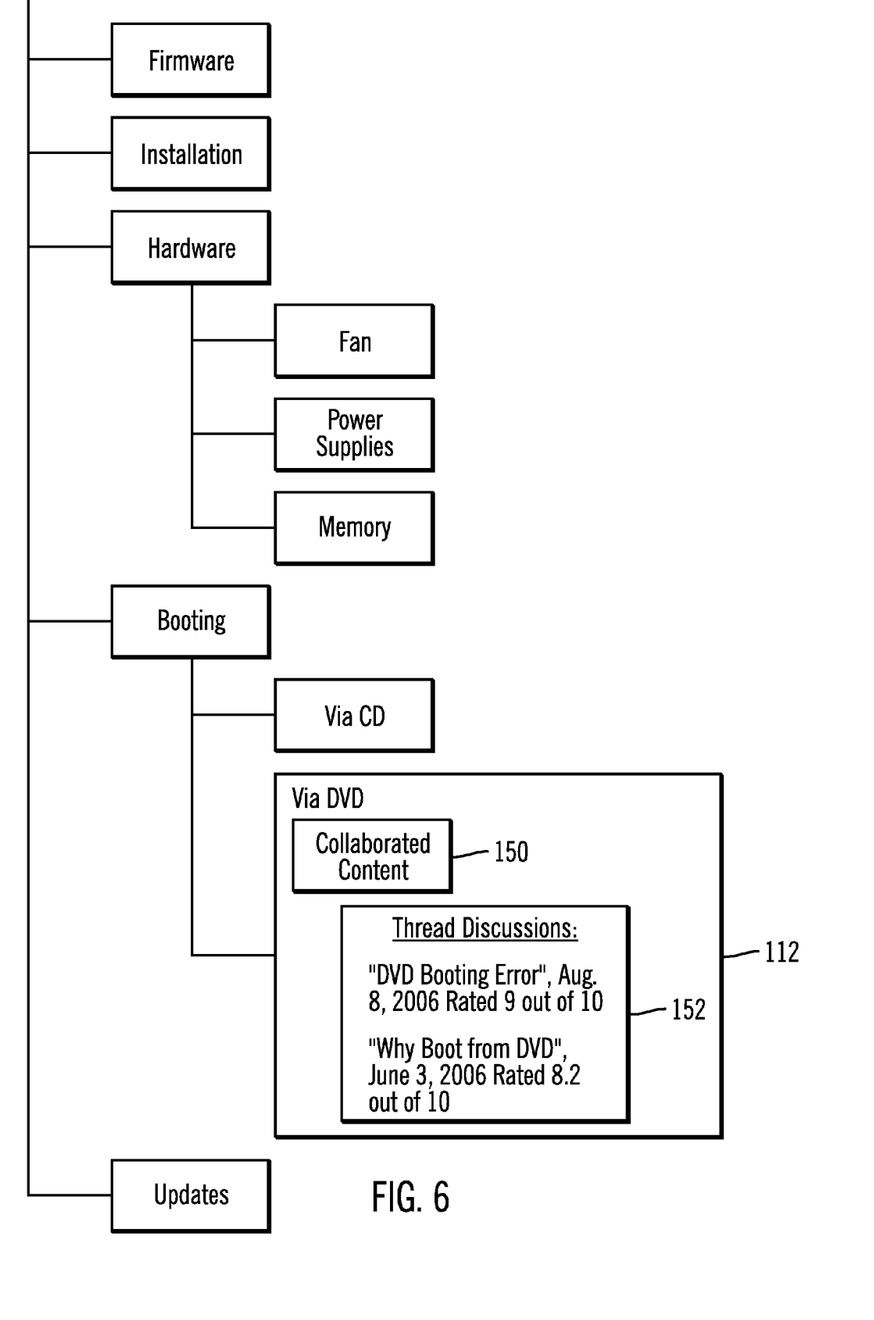
FIG. 6 illustrates an embodiment of message thread content promoted to a category in a content management system.

FIG. 6 illustrates an example of the promotion of the content of the message thread 140 to a category of content objects whose subject matter is relevant to the subject matter of the message thread 140. In the example of FIG. 6, the category "Booting via DVD" 112 includes collaborative content 150 comprising one or more content objects created and edited by users of the content management system 16 and a content object 152 including the content from the message thread 140 that content is relevant to the category 112.

Figure 7:
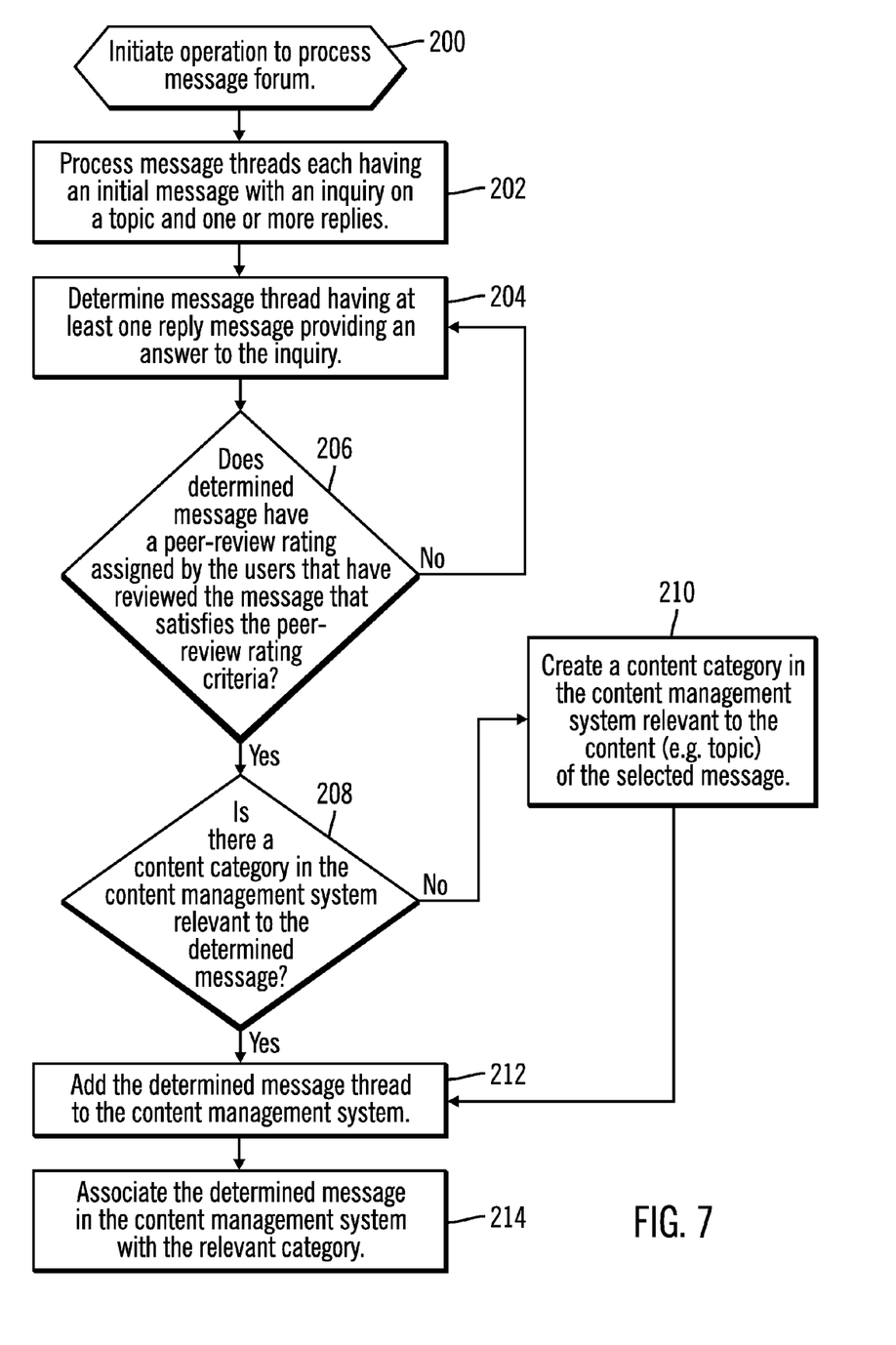
FIG. 7 illustrates an embodiment of operations to promote message thread content to a content management system.

FIG. 7 illustrates an embodiment of operations performed by the message promoter 22 program to promote or add content from message threads 6 in one or more message forums 4 to the content management system 16. As discussed, the message promoter 22 may scan user designated message forums 4 over the network 10, such as a private network (e.g., Intranet) or publicly accessible network such as the Internet. Alternatively, the message promoter 22 may crawl or traverse message forums accessible over the network 10 for information. Upon initiating (at block 200) processing of a located message forum 4, the message promoter 22 processes (at block 202) the messages 6 and determines (at block 204) one or more message threads 6 having at least one reply message 56 providing an answer or information responsive to the inquiry specified in the initial message 54 (FIG. 2). The message promoter 22 may then determine (at block 206) whether the determined message has a peer-review rating 58 assigned by the users that have reviewed the message in the message forum 4 that satisfies a peer-review rating criteria, such as a minimally acceptable peer-review rating. In further embodiment, the message promoter 22 program may enable a user to review determined message threads 6 to further determine whether the thread should be promoted to the content management system 16 and/or to edit the message thread 6 to remove extraneous information not relevant to the inquiry and answer to the problem posed by the inquiry.

If (at block 206) the rating of the determined thread satisfies the rating criteria (or the user has selected to promote the message), then the message promoter 22 determines (at block 208) a content category 72 (FIG. 3) from the content management system 16 that is relevant to the content (topic) of the determined message thread. For instance, a content category may be relevant if the category definition 74 includes terms or keywords that match terms, keywords or topic terms of the determined message thread 6, such as terms in the topic heading, subject heading or body of the initial message having the inquiry. The relevant content categories may be determined by processing information on content categories 70 in content information 20 to determine a content category 72 having a definition 74 matching the topic or terms of the determined message thread 6. Alternatively, the message promoter 22 may traverse content objects 12 to determine content objects associated with categories, as indicated in metadata, tags, or the body of the content object 16, relevant to or matching the topic or content of the determined message thread 6. If the rating is not satisfied (at block 206), then the message promoter 22 may proceed back to block 204 to consider a next message thread 6 in the message forum 4. If (at block 208) a relevant content category for the determined message thread 6 is not determined, then the message promoter 22 may proceed to block 204 to consider a next message. Alternatively, the message promoter 22 may create (at block 210) a new category in the content management system 16 for the topic of the determined message thread 6.

Once a category relevant to the content of the determined message thread 22 is determined (from the yes branch of block 208) or created (from block 210), the message promoter 22 adds (at block 212) all or part of the determined message thread 6 to the content management system 16 and associates (at block 214) the determined message 6 in the content management system with the relevant category. In one embodiment, the determined message thread 6 may be added to the content management system 16 by inserting some or all of the message thread content into a new or preexisting content object 18. For instance, the message thread content can be inserted into a content page associated with the same category as the message thread. Alternatively, message thread content can be added to a separate content object and a reference (e.g., link) to the message thread content may be added to one or more content objects in the relevant content category.

Described embodiments provide techniques to promote messages (or other content) from one content management system, such as a message form, to another content management system, such that the promoted message is associated with a relevant category of content objects in the content management system and available for review and further editing by users of the content management system.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In one embodiment, if multiple content categories in the content management system 16 are relevant to one message thread, then the content of the method thread may be associated with multiple of those categories, such as added to content objects in the multiple categories.

In the described embodiment of FIG. 1, messages were promoted from a message forum to a content management system. In an alternative embodiment, content may be promoted from a content management system other than a message forum, such as a Wiki, Blog, or other content management system where users collaborate to add and edit content objects. In such an alternative embodiment, a content promoter may process content in a first content management system to determine content satisfying a content criteria, such as a user peer-review rating criteria. The first content management system may include content objects added by users in a collaborative environment. The content promoter may process a second content management system providing content objects associated with content categories to determine a content category relevant to the determined content from the first content management system. The determined content satisfying the content criteria may then be added to the second content management system and the content added to the second content management system may then be associated with the determined content category.

Figure 8:
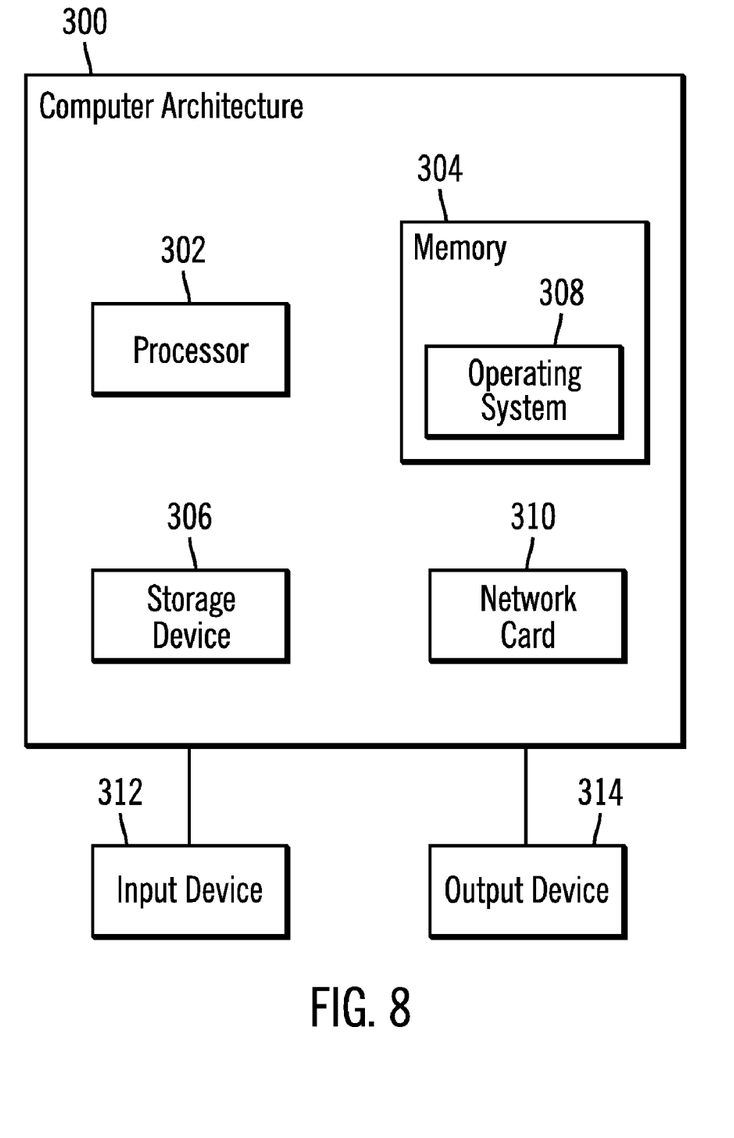
FIG. 8 illustrates an embodiment of a computer architecture that may be used with the systems in FIG. 1.

FIG. 8 illustrates one implementation of a computer architecture 300 that may be implemented at the message server 2, content server 14, and user systems 8. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs, including an operating system 308, device drivers and application programs, in the storage 306 are loaded into the memory 304 and executed by the processor 302 in a manner known in the art. The architecture further includes a network card 310 to enable communication with a network. An input device 312 is used to provide user input to the processor 302, and may include a keyboard, mouse, pen-stylus, microphone, touch sensitive display screen, or any other activation or input mechanism known in the art. An output device 314 is capable of rendering information transmitted from the processor 302, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variable "n" when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIG. 7 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   determining whether messages from a computer implemented message forum having messages posted from different users over a network satisfy a message peer review rating criteria;
   for each determined message satisfying the peer review rating criteria, processing a content management system providing content objects associated with content categories to determine whether the content management system provides a content category relevant to the determined message;
   adding the determined message, satisfying the peer review rating criteria, from the message forum to the determined content category of the content management system that is relevant to the determined message in response to determining that the content management system provides the determined content category of relevance to the determined message;
   associating the message added to the content management system with the determined content category; and
   in response to determining that one message does not satisfy the peer review rating criteria, continuing to perform the determining of whether the messages satisfy the peer review rating criteria without adding the message that does not satisfy the peer review rating criteria to the content management system.

2. The method of claim 1, further comprising:
   determining that there is no content category in the content management system relevant to the content of the determined message;
   creating a content category in the content management system relevant to the content of the selected message in response to determining that there is no content category of relevance to the content of the determined message; and
   associating the determined message in the content management system with the created content category.

3. The method of claim 1, wherein determining the content category comprises:
   determining the content category having a description matching at least one term from the determined message.

4. The method of claim 1, wherein determining the message comprises:
   determining one message having a peer-review rating assigned by users that have reviewed the message that satisfies the peer review rating criteria.

5. The method of claim 1, wherein a message thread includes an initial message having an inquiry on a topic and at least one reply message to the initial message, where determining the message satisfying the message peer review rating criteria comprises:
   determining one message thread including at least one reply message providing an answer to the inquiry in the initial message, wherein the determined content category has a description matching terms of the topic of the inquiry.

6. The method of claim 5, wherein the determining of the message further comprises:
   determining whether the determined thread also satisfies the peer review rating criteria, wherein the determined thread is added to the content message system in response to determining that the determined thread satisfies the peer review rating criteria.

7. The method of claim 1, wherein adding the determined message to the content management system comprises:
   adding the content of the determined message to a content object associated with the determined content category.

8. The method of claim 1, wherein adding the determined message to the content management system comprises:
   adding a reference to a first content object associated with the determined content category to a second content object in the content management system that includes the selected message.

9. A system in communication with a computer implemented message forum having messages posted from different users over a network, comprising:
   a content server including a processor and a content management system executed by the processor to provide content objects associated with content categories; and
   a message promoter enabled to cause operations to be performed, the operations comprising:
      determining whether messages from a computer implemented message forum having messages posted from different users over a network satisfy a message peer review rating criteria;
      for each determined message satisfying the peer review rating criteria, processing the content management system to determine whether the content management system provides a content category relevant to the determined message; and
      adding the determined message, satisfying the peer review rating criteria, from the message forum to the determined content category of the content management system that is relevant to the determined message in response to determining that the content management system provides the determined content category of relevance to the determined message;
      associating the message added to the content management system with the determined content category; and in response to determining that one message does not satisfy the peer review rating criteria, continuing to perform the determining of whether the messages satisfy the peer review rating criteria without adding the message that does not satisfy the peer review rating criteria to the content management system.

10. The system of claim 9, wherein the message promoter is further enabled to cause operations comprising:
determining that there is no content category in the content management system relevant to the content of the determined message;
creating a content category in the content management system relevant to the content of the selected message in response to determining that there is no content category of relevance to the content of the determined message; and
associating the determined message in the content management system with the created content category.

11. The system of claim 9, wherein determining the message comprises:
determining one message having a peer review rating assigned by users that have reviewed the message that satisfies the peer-review rating criteria.

12. The system of claim 9, wherein a message thread includes an initial message having an inquiry on a topic and at least one reply message to the initial message, where determining the message satisfying the message peer review rating criteria comprises:
determining one message thread including at least one reply message providing an answer to the inquiry in the initial message, wherein the determined content category has a description matching terms of the topic of the inquiry.

13. The system of claim 9, wherein adding the determined message to the content management system comprises:
adding the content of the determined message to a content object associated with the determined content category.

14. An article of manufacture comprising a computer readable medium having code executed to perform operations to communicate with a computer implemented message forum having messages posted from different users over a network and operations to be performed, the operations comprising:
determining whether messages from a computer implemented message forum having messages posted from different users over a network satisfy a message peer review rating criteria;
for each determined message satisfying the peer review rating criteria, processing a content management system providing content objects associated with content categories to determine whether the content management system provides a content category relevant to the determined message;
adding the determined message, satisfying the peer review rating criteria, from the message forum to the determined content category of the content management system that is relevant to the determined message in response to determining that the content management system provides the determined content category of relevance to the determined message;
associating the message added to the content management system with the determined content category; and
in response to determining that one message does not satisfy the peer review rating criteria, continuing to perform the determining of whether the messages satisfy the peer review rating criteria without adding the message that does not satisfy the peer review rating criteria to the content management system.

15. The article of manufacture of claim 14, further comprising:
determining that there is no content category in the content management system relevant to the content of the determined message;
creating a content category in the content management system relevant to the content of the selected message in response to determining that there is no content category of relevance to the content of the determined message; and
associating the determined message in the content management system with the created content category.

16. The article of manufacture of claim 14, wherein determining the message comprises:
determining one message having a peer review rating assigned by users that have reviewed the message that satisfies the peer review rating criteria.

17. The article of manufacture of claim 14, wherein a message thread includes an initial message having an inquiry on a topic and at least one reply message to the initial message, where determining the message satisfying the message peer review rating criteria comprises:
determining one message thread including at least one reply message providing an answer to the inquiry in the initial message, wherein the determined content category has a description matching terms of the topic of the inquiry.

18. The article of manufacture of claim 17 wherein the determining of the message further comprises:
determining whether the determined thread also satisfies the peer review rating criteria, wherein the determined thread is added to the content message system in response to determining that the determined thread satisfies the peer review rating criteria.

19. The article of manufacture of claim 14, wherein adding the determined message to the content management system comprises:
adding the content of the determined message to a content object associated with the determined content category.

20. A method, comprising:
processing content objects in a first content management system;
determining whether the content objects satisfy a peer review rating criteria, wherein the first content management system includes content objects added by users in a collaborative environment;
for each determined content object satisfying the peer review rating criteria, processing a second content management system providing content objects associated with content categories to determine whether the second content management system provides a content category relevant to the determined content object from the first content management system;
adding the determined content object from the first content management system, satisfying the peer review rating criteria, to the determined content category of the second content management system that is relevant to the determined content in response to determining that the second content management system provides the determined content category of relevance to the determined content;
associating the content object added to the second content management system with the determined content category; and
in response to determining that one content object does not satisfy the peer review rating criteria, continuing to perform the determining of whether the content objects satisfy the peer review rating criteria without adding the content object that does not satisfy the peer review rating criteria to the second content management system.

21. The method of claim 20, wherein determining the content category in the second content management system comprises:

determining whether the second content management system has one content category associated with terms or keywords that match terms or keywords associated with the determined content object in the first content management system satisfying the peer review rating criteria.

* * * * *